Jan. 13, 1970  E. R. LANNUM  3,490,014

APPARATUS FOR TESTING RADAR MAGAZINES

Filed Feb. 21, 1967  2 Sheets-Sheet 1

INVENTOR.
EARL R. LANNUM
BY Harry A. Herbert Jr.
ATTORNEY

Henry S. Miller
AGENT cally. A momentary switch on the testing device
is pressed activating a motor which advances the film.
Lights on the testing device indicate whether the magazine is functioning properly or not. A micro switch following a cam turns the motor off after one revolution.

United States Patent Office 3,490,014
Patented Jan. 13, 1970

3,490,014
APPARATUS FOR TESTING RADAR MAGAZINES
Earl R. Lannum, 1328 W. Kildare,
Lancaster, Calif. 93534
Filed Feb. 21, 1967, Ser. No. 618,311
Int. Cl. G08b *21/00*
U.S. Cl. 340—267                    1 Claim

ABSTRACT OF THE DISCLOSURE

An apparatus having a plug in unit for radar film magazines for testing the film advance both electrically and mechanically. A momentary switch on the testing device is pressed activating a motor which advances the film. Lights on the testing device indicate whether the magazine is functioning properly or not. A micro switch following a cam turns the motor off after one revolution.

---

The invention described herein may be manufactured and used by or for the United States Government for governmental purposes without payment to me of any royalty thereon.

This invention relates generally to a device for testing radar film recording magazines and more specifically to an apparatus which will advance the film in a magazine a predetermined amount to insure its proper installation.

The apparatus of this invention provides a light weight compact and portable means for testing film magazines of the type utilized for keeping a photographic record of radar patterns displayed on the face of the radar scope. The magazine may be used on ground or airborne radar equipment.

Heretofore there was no way that the film magazines could be checked and their proper operation verified prior to actual flight when used in aircraft. Under operational conditions the malfunction of a film magazine could lead to an improper assessment of the tactical situation whereas under test conditions the inoperative magazine could render an entire mission void and require a re-flying in order to obtain the necessary technical data.

With the testing device of this invention, it is possible to verify the proper operation of the film magazine after it is completely assembled and before it is installed in the radar system. Since this apparatus is compact, lightweight and capable of battery powered operation, it can be utilized in remote areas and carried to the aircraft for last minute checks.

Accordingly, it is an object of this invention to provide a new and improved radar magazine testing device.

It is a further object to provide a new and improved radar magazine testing device which is compact, lightweight and can be hand carried.

It is still another object of this invention to provide a new and improved film magazine testing apparatus which will convey a minimum amount of film in the magazine.

It is still a further object of this invention to provide a new and improved film magazine testing apparatus which will provide full confidence in the operation of the device thereby eliminating the need for costly back-up magazines.

It is still another object of this invention to provide a new and improved radar film magazine testing apparatus which is capable of detecting both electrical and mechanical malfunctions.

It is another object of this invention to provide a radar film magazine testing apparatus which is economical to produce and utilizes conventional, currently available components that lend themselves to standard mass production manufacturing techniques.

These and other advantages, features and objects of the invention will become more apparent from the following description taken in connection with the illustrative embodiments in the accompanying drawings, wherein.

Figure 1:
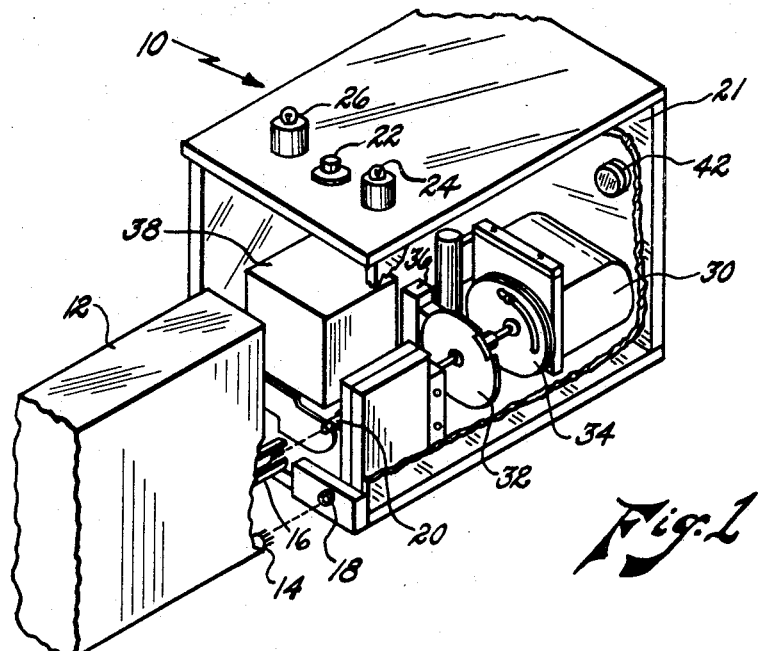
FIGURE 1 is a perspective view partly in section of this invention.
Figure 2:
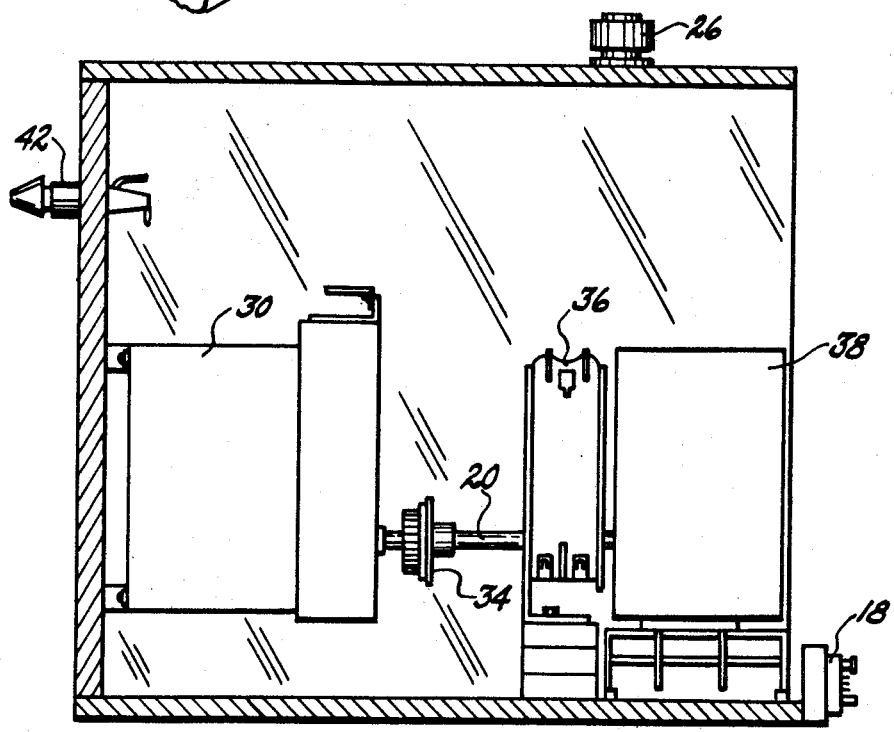
FIGURE 2 is a side elevational view of the testing device in accordance with this invention.

Referring now to FIGURES 1 and 2, there is shown generally a testing apparatus 10 and film magazine 12. The magazine is equipped with a male electrical connector 14 and a shaft 16 which mechanically advances the film in the magazine. During the test sequence the magazine is plugged into the tester, the male plug fitting into a matching female plug 18 while the shaft of the magazine being flat on one side mates with a similar shaft on the tester 20. The tester is contained in a box-like structure 21 with all or part of one end removed. It may be constructed from plastic or other suitable material.

Mounted on the outside of the tester is a momentary switch 22 for operating the tester, while two indicator lights 24 and 26 indicate the condition of the film in the magazine.

The tester of this invention consists of an electric motor 30 which has a shaft 20 extending therefrom. The motor turns preferably in the counter clockwise direction with a minimum torque of 5 inch pounds. This criteria will vary according to film magazine to be tested and is in no way meant to limit the scope of this invention. On the shaft is mounted a cam 32 having two 120° lobes. An adjustment means 34 is provided to ensure proper positioning of the cam on the shaft in relation to the micro switch 36 which follows the cam. A relay 38 actuated by the momentary switch 22 and acting in conjunction with the micro switch 36 and a cam driven micro switch 64 in the magazine form the main components of the tester electrical system.

Figure 3:
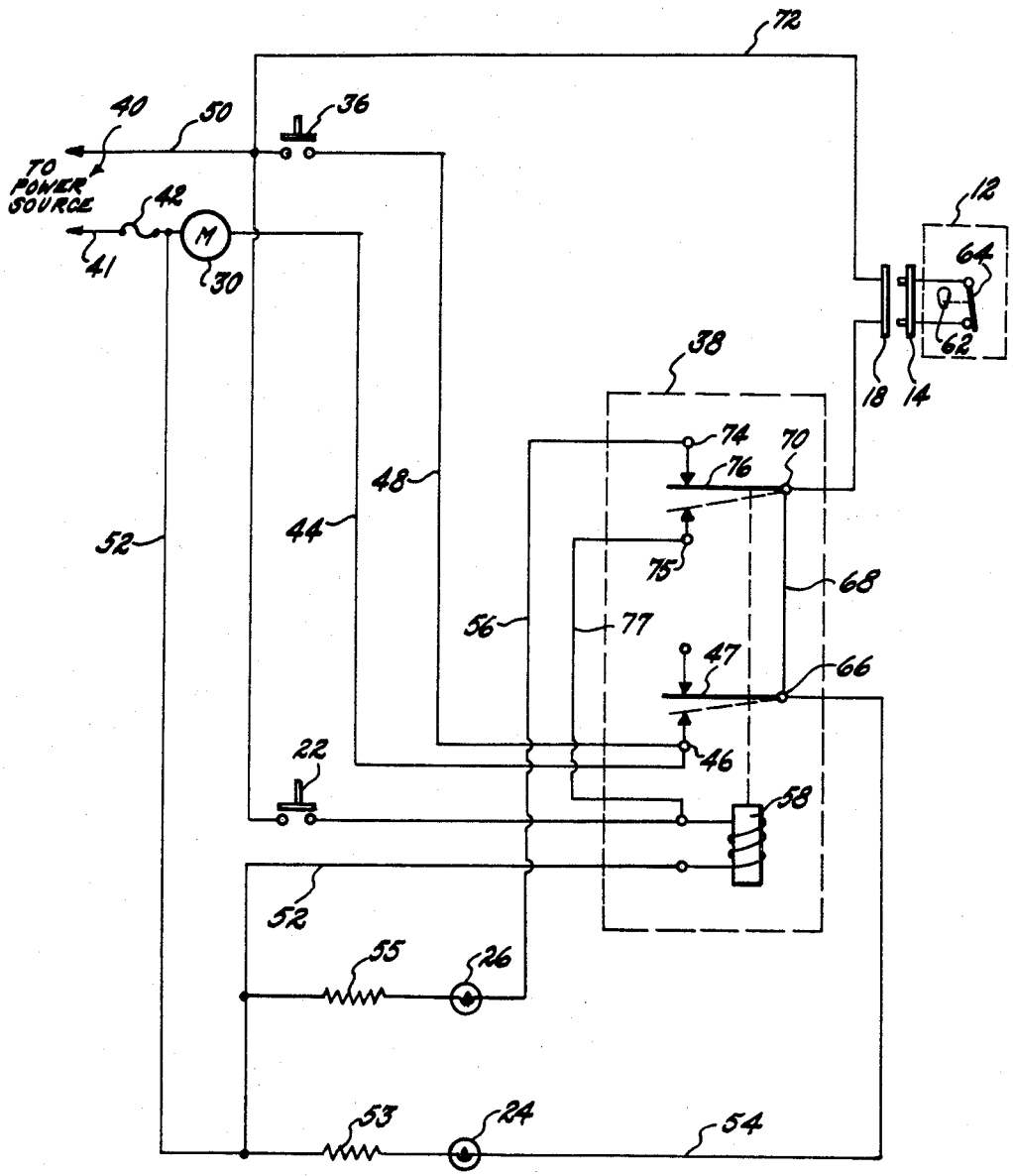
FIGURE 3 is a circuit diagram of the radar film magazine tester in accordance with this invention.

The electrical system is shown in detail in FIGURE 3. A source of power is located generally at 40. As aforementioned, it may be either ordinary 110 volt house current for bench use or a battery pack for portable use. The input line 41 is fused at 42 and connects to the motor 30. The line then runs from the motor to terminal 46 of the relay 38. The line 50 is connected through micro switch 36 to terminal 46. The line 52 supplies power to the lights 24 and 26 as well as to the actuating coil 58 of the relay 38.

Upon supplying power to the tester neither light 24 nor 26 will light. However, upon plugging the magazine into the tester with the plugs 14 and 18, after having turned the cam 62 whereby the magazine micro switch 64 is in the closed position, both lights will light if the magazine is loaded properly and the switch is following the cam properly. Current will flow from line 52 through resistor 53 and bulb 24 to contact 66 of the relay 38 and along line 68 to terminal 70. From the relay the current flows into the magazine through the closed relay 64 and back out through line 72 to line 50. Similarly the current flows from line 52 to resistor 55, bulb 26 and contact 74 of the relay where it is carried across the arm 76 of the relay to contact 70 and travels the same route through the magazine to line 50.

When the momentary switch 22 is closed current flows along line 52 through the coil 58 through the switch 22 and back to line 50. Depressing the switch activates the relay 38.

When the relay 38 is activated the arm 76 moves from contact 74 to contact 75 which breaks the circuit for the light 26 causing it to go out. The current will now flow through arm 76, contact 75 along line 77 thereby maintaining the relay in the dashed line position. The circuit for light 24 will remain closed and the light will remain on. The relay arm 47 will now be in contact with 46. Current will then flow from line 52 through the relay coil 58 line 54 to contact 66 of the relay 38. The current will pass through the arm 47 to contact 46 and along line 44 to the motor 30. As the motor turns it will close the micro switch 36 completing the circuit from line 50 through the motor 30 to line 41. The motor will continue to operate until the switch 36 is opened by a depression in the cam 32 (FIGURE 1).

As the motor 30 turns its shaft 20 is mechanically connected to the cam 62 of the film magazine 12. As the cam 62 turns micro switch 64 opens thereby interrupting the flow of current along line 72 through the magazine to contact 70 of the relay. This will cause the light 24 to go off since it is connected to contact 66 of the relay and current passes via line 68 between the two contacts.

When the film has advanced the equivalent to one revolution of motor 30 the micro switch 36 will open and cause the motor to stop. As the cam in the magazine returns to its original position the light 24 will go on as micro switch 64 closes. When the motor stops the switch is opened by hand and the light 26 will go on.

The lights of the tested indicate the electrical condition of the film magazine, and a slowing of the tester motor will indicate any binding in the film advancing mechanism. Alternatively, an ammeter could be inserted in the power lead 41 to the motor thereby visually indicating an increase in current flow to the motor caused by improper loading of the film magazines. Generally, film magazines are equipped with a digital indicating system whereby a record is kept of the film used. In utilizing this tester a visual check is made of the digital indicating means to insure that the film is advancing properly as the motor of the tester turns the cam and film driving means of the magazine.

I claim:
1. An apparatus for testing film magazines comprising: a housing; a motor means mounted in the housing and having a shaft extending therefrom for connecting the testing device to the device to be tested; a cam fixedly mounted on said motor shaft; a first switch mounted in the housing adjacent to said cam and connected to the motor circuit; said switch having a cam follower riding on the cam for actuating the switch and allowing the motor to complete a single revolution; a second switch connected to the motor circuit for starting the motor; an electrical connector means mounted in the housing for connecting the testing device to the device to be tested; and a plurality of visual indication means mounted in the housing and connected to the tested device through said electrical connector for indicating the electrical condition of the tested device.

References Cited

UNITED STATES PATENTS

| | | | |
|---|---|---|---|
| 2,474,843 | 7/1949 | Helsing | 318—466 |
| 1,132,345 | 3/1915 | Hollerith | 340—267 |
| 3,319,087 | 5/1967 | Wintriss. | |

JOHN W. CALDWELL, Primary Examiner

P. PALAN, Assistant Examiner

U.S. Cl. X.R.

318—466